United States Patent
Thomas-Lepore et al.

(10) Patent No.: US 8,194,069 B2
(45) Date of Patent: Jun. 5, 2012

(54) LAYERED PERSONALIZATION

(75) Inventors: Grant Thomas-Lepore, Newton, MA (US); Iwao Hatanaka, Acton, MA (US); Murali Menon, Lexington, MA (US)

(73) Assignee: Gemvara, Inc., Boston, MA (US)

( * ) Notice: Subject to any disclaimer, the term of this patent is extended or adjusted under 35 U.S.C. 154(b) by 0 days.

(21) Appl. No.: 13/111,773

(22) Filed: May 19, 2011

(65) Prior Publication Data

US 2011/0216062 A1 Sep. 8, 2011

Related U.S. Application Data

(63) Continuation of application No. 12/684,103, filed on Jan. 7, 2011, now abandoned.

(60) Provisional application No. 61/152,549, filed on Feb. 13, 2009, provisional application No. 61/230,192, filed on Jul. 31, 2009.

(51) Int. Cl.
*G06T 15/00* (2006.01)
*G06T 17/00* (2006.01)
*G09G 5/00* (2006.01)
*G06F 3/00* (2006.01)

(52) U.S. Cl. ......... 345/420; 345/419; 345/619; 715/700

(58) Field of Classification Search .................. 345/419, 345/420, 619; 715/700, 733
See application file for complete search history.

(56) References Cited

U.S. PATENT DOCUMENTS

| | | | | |
|---|---|---|---|---|
| 6,016,150 | A * | 1/2000 | Lengyel et al. | 345/426 |
| 7,149,665 | B2 * | 12/2006 | Feld et al. | 703/2 |
| 2004/0243361 | A1 * | 12/2004 | Steuben et al. | 703/2 |
| 2005/0137015 | A1 * | 6/2005 | Rogers et al. | 463/42 |
| 2005/0222862 | A1 * | 10/2005 | Guhde et al. | 705/1 |
| 2006/0274070 | A1 * | 12/2006 | Herman et al. | 345/474 |
| 2008/0163344 | A1 * | 7/2008 | Yang | 726/4 |

* cited by examiner

*Primary Examiner* — David T Welch
(74) *Attorney, Agent, or Firm* — Robert Plotkin, P.C.

(57) ABSTRACT

A computer system includes a three-dimensional model of an object such as a piece of jewelry. The model is divided into multiple layers, each of which contains one or more components of the object. Each layer is associated with one or more attribute types, each of which is associated with a corresponding plurality of possible attribute values. The system pre-renders each layer with each possible attribute type and each possible attribute value for that type and layer. The resulting layer renderings may be combined with each other to produce personalized renderings of the entire object without the need to pre-render all possible combinations of attribute values. Responsibility for rendering the layers and the final complete object personalization may be divided between client and server in a variety of ways to increase efficiency.

20 Claims, 13 Drawing Sheets

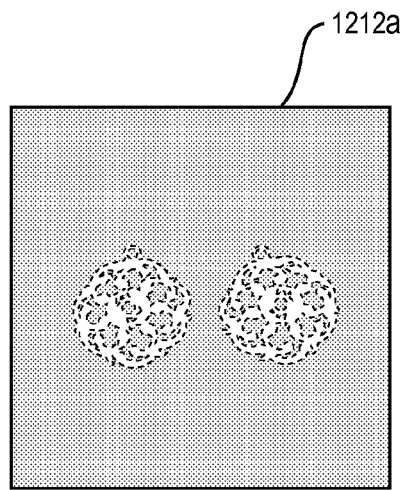
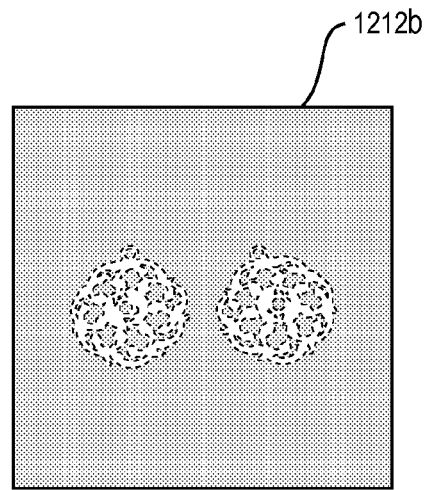
+
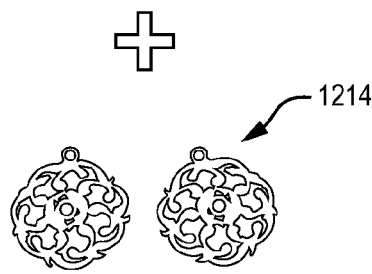
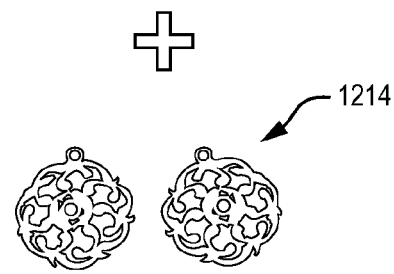
+
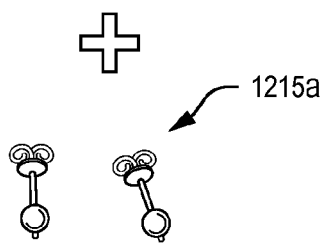
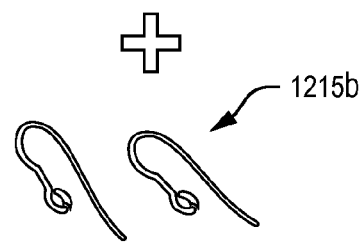
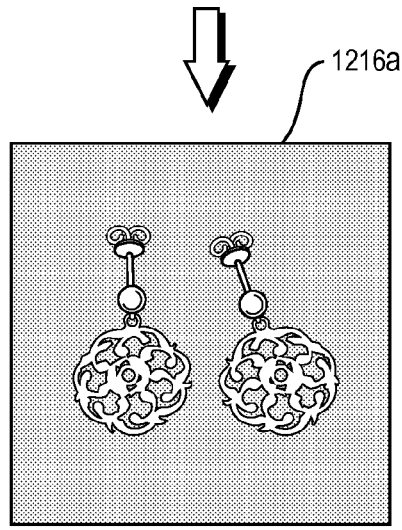
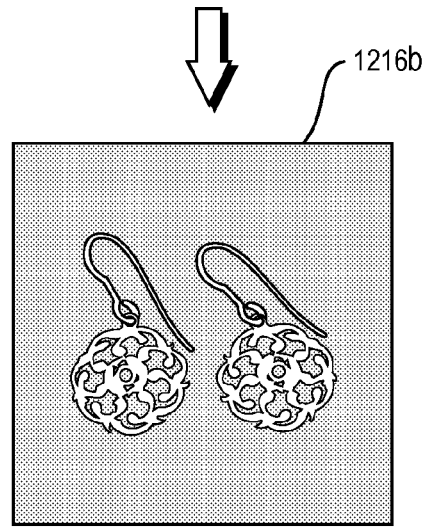
FIG. 12C           FIG. 12D

LAYERED PERSONALIZATION

CROSS-REFERENCE TO RELATED APPLICATIONS

This application is a continuation of and commonly-owned U.S. patent application Ser. No. 12/684,103, filed on Jan. 7, 2010 now abandoned, entitled, "Layered Personalization"; which claims the benefit of U.S. Prov. Pat. App. Ser. No. 61/152,549, filed on Feb. 13, 2009, entitled, "Layered Personalization"; and U.S. Prov. Pat. App. Ser. No. 61/230,192, filed on Jul. 31, 2009, entitled, "Layered Personalization."

BACKGROUND

Customers are increasingly demanding personal control over the products they purchase. For example, for many years computer retailers have provided consumers with the ability to specify the precise components of the computers they wish to purchase. In response to a particular customer's custom order, the retailer manufactures a single computer having the components specified by the customer, and then ships the custom-built computer to the consumer. This is an early example of what has now come to be known as "mass customization"—the manufacture and sale of highly-customizable mass-produced products, in quantities as small as one. Mass customization is now spreading to a wider and wider variety of products.

Purchasers of computers are primarily interested in the internal functionality of the computers they purchase, not their external appearance. Therefore, it is relatively unimportant for a purchaser of a computer to see what a customized computer will look like before completing the purchase.

This is not true, however, for many other products, such as jewelry, for which aesthetics are a primary component of the consumer's purchasing decision. Traditionally, product catalogs and web sites have been able to provide consumers with high-quality images of products offered because such products have not been customizable. Therefore, traditionally it has been sufficient to provide consumers with a single image of a non-customizable product before purchase. Even when products have been customizable, they have not been highly customizable. For example, in some cases it has been possible to select the product's color from among a small selection of offered colors. In this case, traditional catalogs and web sites might either display a single image of a product, alongside a palette of colors, or instead display separate images of the product, one in each color.

Such techniques may be sufficient for non-customizable products or for products with very limited customizability. Such techniques are not, however, sufficient to convey to the consumer an accurate understanding of the appearance of a highly customizable product before the consumer finalizes the purchase decision. If the final appearance of the product is particularly important to the consumer, this inability to view an accurate representation of the final product, reflecting all customizations, may make the consumer unwilling to purchase such a product.

Although one way to enable the consumer to view customized versions of a product for evaluation before purchase is to provide the consumer's computer with software for rendering any possible customized version of the product, doing so using existing techniques would require equipping each consumer's computer with powerful CAD software which is capable of producing realistic two-dimensional renderings of the product based on a three-dimensional CAD model. Few, if any, consumers would be willing to incur this cost and expense.

What is needed, therefore, are improved techniques for quickly generating and displaying a wide range of high-quality images of highly-customizable products.

SUMMARY

A computer system includes a three-dimensional model of an object such as a piece of jewelry. The model is divided into multiple layers, each of which contains one or more components of the object. Each layer is associated with one or more attribute types, each of which is associated with a corresponding plurality of possible attribute values. The system pre-renders each layer with each possible attribute type and each possible attribute value for that type and layer. The resulting layer renderings may be combined with each other to produce personalized renderings of the entire object without the need to pre-render all possible combinations of attribute values. Responsibility for rendering the layers and the final complete object personalization may be divided between client and server in a variety of ways to increase efficiency.

For example, in one embodiment of the present invention, a computer-implemented method is used in conjunction with a three-dimensional computer model of an object. The model includes a plurality of layers, wherein each of the plurality of layers includes at least one corresponding component in the model. Each of the plurality of layers is associated with at least one attribute. The method includes: (A) rendering each of the plurality of layers with each of a plurality of values of the at least one attribute to produce a plurality of layer renderings; (B) receiving a first request for a first rendering of a personalized object specifying a plurality of attribute values; (C) selecting, from among the plurality of layer renderings, a subset of layer renderings corresponding to the specified plurality of attribute values; and (D) combining the selected subset of layer renderings to produce the first rendering of the personalized object.

BRIEF DESCRIPTION OF THE DRAWINGS

FIGS. 12A-D illustrate combining renderings of variable-shaped components with renderings of fixed-shape components according to embodiments of the present invention.

DETAILED DESCRIPTION

Embodiments of the present invention are directed to a method for efficiently generating componentized 2D (2 dimensional) rasterized views of an object, such as a ring or other piece of jewelry, from a 3D (3 dimensional) model of the object. A 3D CAD (Computer Aided Design) model is used to represent a complete 3D geometry of the object. The object is decomposed into components or parts that can be personalized on demand.

For example, a ring may have a shank, center stone, side stones, and associated settings. To personalize the ring a user may want to change the type of center and side stones, or the metal types of the shank, center stone, and side stone settings. Embodiments of the present invention personalize components of the ring or other object by structuring, labeling, and processing a 3D CAD model of the object to generate a tractable set of 2D views that can be combined on demand into a large combinatorial set of photorealistic, personalized object views.

Figure 1:
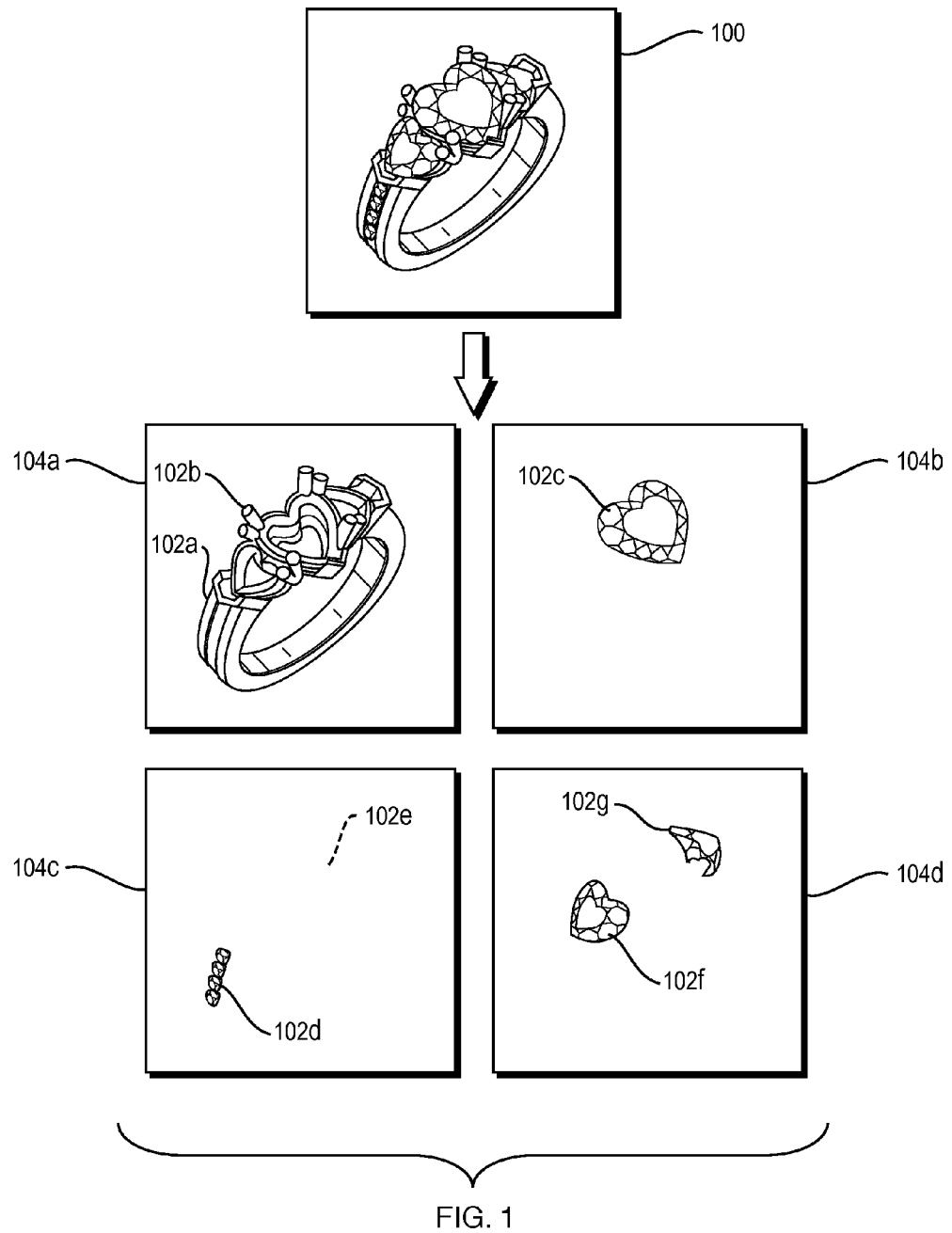
FIG. 1 shows a two-dimensional rendering of a three-dimensional model of a ring according to one embodiment of the present invention.
Figure 2:
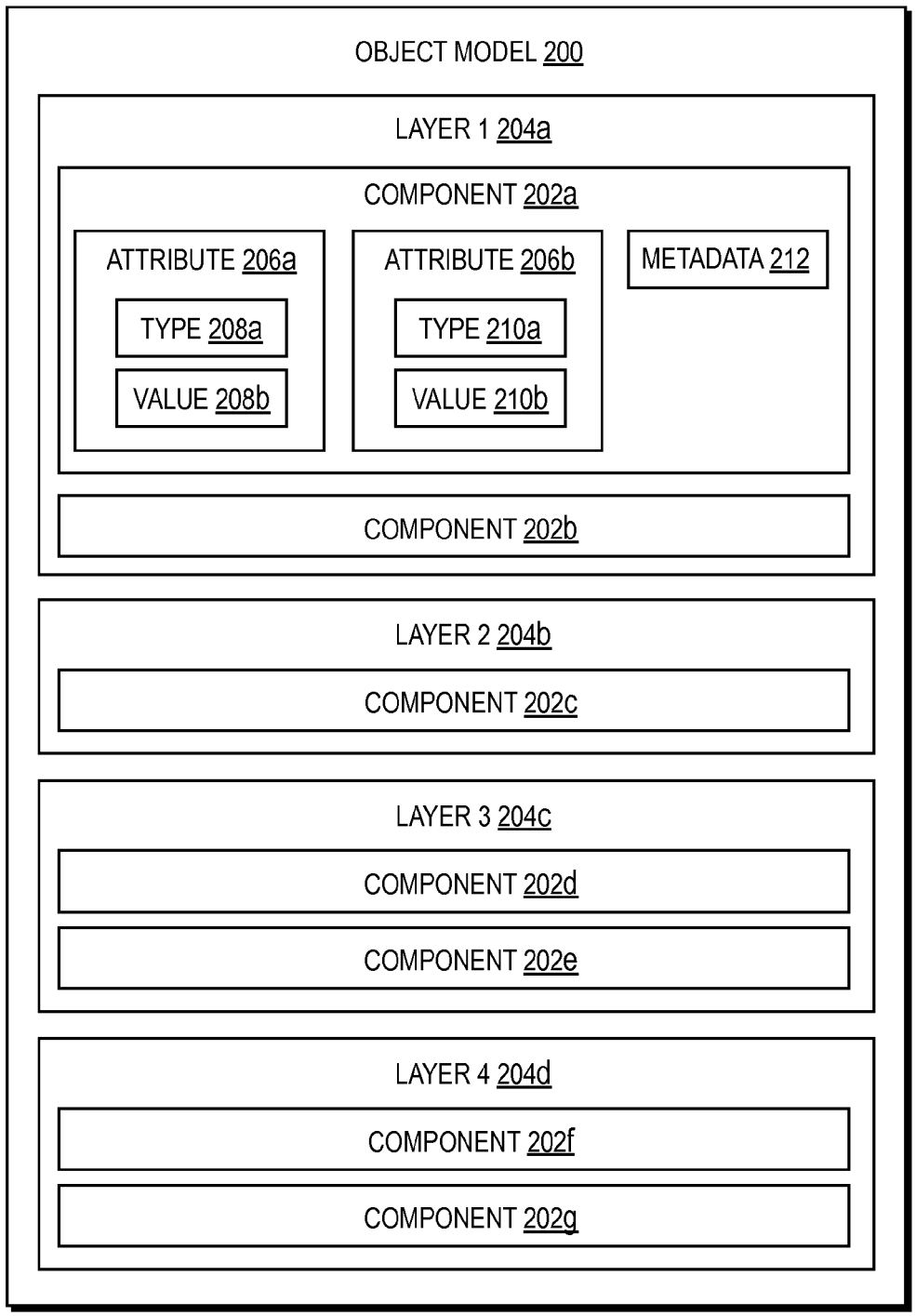
FIG. 2 is a diagram of an object model representing an object, such as a ring, according to one embodiment of the present invention.

More specifically, in accordance with embodiments of the present invention, a designer or other user may create a 3D model of an object, such as by using standard CAD software. Referring to FIG. 1, an example is shown of a two-dimensional rendering of a three-dimensional model 100 of an object, a ring in this example. Referring to FIG. 2, a diagram is illustrated of an object model 200 representing an object, such as a ring.

The particular ring object rendering 100 shown in FIG. 1 has eight components 102a-g: a shank 102a, center stone setting metal 102b, center stone 102c, a first pair of side stones 102d-e, and a second pair of side stones 102f-g. Similarly, the corresponding object model 200 shown in FIG. 2 contains components 202a-g, which correspond to the components 102a-g in the rendering 100 of FIG. 1. Although the particular object model 200 shown in FIG. 2 contains seven components 202a-g, this is merely an example; object models may contain any number of components.

The components in a particular object model may be selected in any manner. For example, the model may be decomposed into components that are relevant for a particular domain, such as personalization by a customer through a web site. Components may, however, be selected from within the CAD model in any manner.

Components 202a-g in the object model 200 may be grouped into m layers that may represent domain relevant characteristics of the object. Although the example object model 200 shown in FIG. 2 contains four layers 204a-d (i.e., m=4), object models may contain any number of layers, each of which may contain any number of components.

In the example object model 200 shown in FIG. 2, layer 204a contains components 202a-b, layer 204b contains component 202c, layer 204c contains components 202d-e, and layer 204d contains components 202f-g. Similarly, the rendering 100 of the object model 200 may be divided into layers 204a-d, where layer 104a contains shank component 102a and center stone setting metal component 102b, layer 104b contains center stone component 102c, layer 104c contains first side stone components 102d-e, and layer 104d contains second side stone components 102f-g.

Although components may be grouped within layers in any way, it may be particularly useful to group similar components together within a single layer. For example, layer 104c contains multiple side stones 102d-e, to facilitate personalization of all of the side stones 102d-e in the layer 104c simultaneously. As another example, if a ring were to contain 100 side stones, those side stones might be grouped into two layers of 50 stones each, so that the user could independently select features (such as stone types) for the two sub-sets independently. These are merely examples of ways in which components may be grouped into layers and do not constitute limitations of the present invention.

Features in existing CAD software may be used to facilitate the process of creating and managing layers. For example, many existing CAD packages allow the user to organize different components of a CAD model into custom-named groups (i.e. Metal 01, Gem 01, etc.). Such custom-named groups may be created and used to represent layers in the object model. Components may be added to the groups in order to add such components to layers in the object model. The attributes for each layer may be loaded into the CAD system so that the CAD system may apply any applicable attribute to components in any particular layer.

Each of the layers 202a-d in the object model 200 may have n attributes that describe physical properties of the object. In the example shown in FIG. 2, component 202a has two attributes 206a-b. Each of the attributes 206a-b has a type and a value (attribute 206a has type 208a and value 208b; attribute 206b has type 210a and value 210b). Examples of attribute types include, but are not limited to, color, material type (e.g., type of metal or stone), shape, size, and finish. Each attribute type may have a corresponding permissible set or range of attribute values. For example, an attribute with a type of "metal type" may have permissible values such as "gold" and "silver," while an attribute with a type of "size" may have permissible values which are floating point numbers ranging from 1 mm to 500 mm. Each attribute may have any number of permissible attribute values.

For ease of illustration only the attributes of component 202a are shown in FIG. 2. It should be assumed, however, that components 202b-g have their own attributes, although they are not shown in FIG. 2.

Each component may have any number of attributes. In other words, the value of n may vary from component to component. In certain examples provided herein, attributes are associated with entire layers rather than individual components, in which case the attribute types and values associated with a particular layer are applied to all components within that layer. In this case, the value of n may vary from layer to layer.

Figure 3:
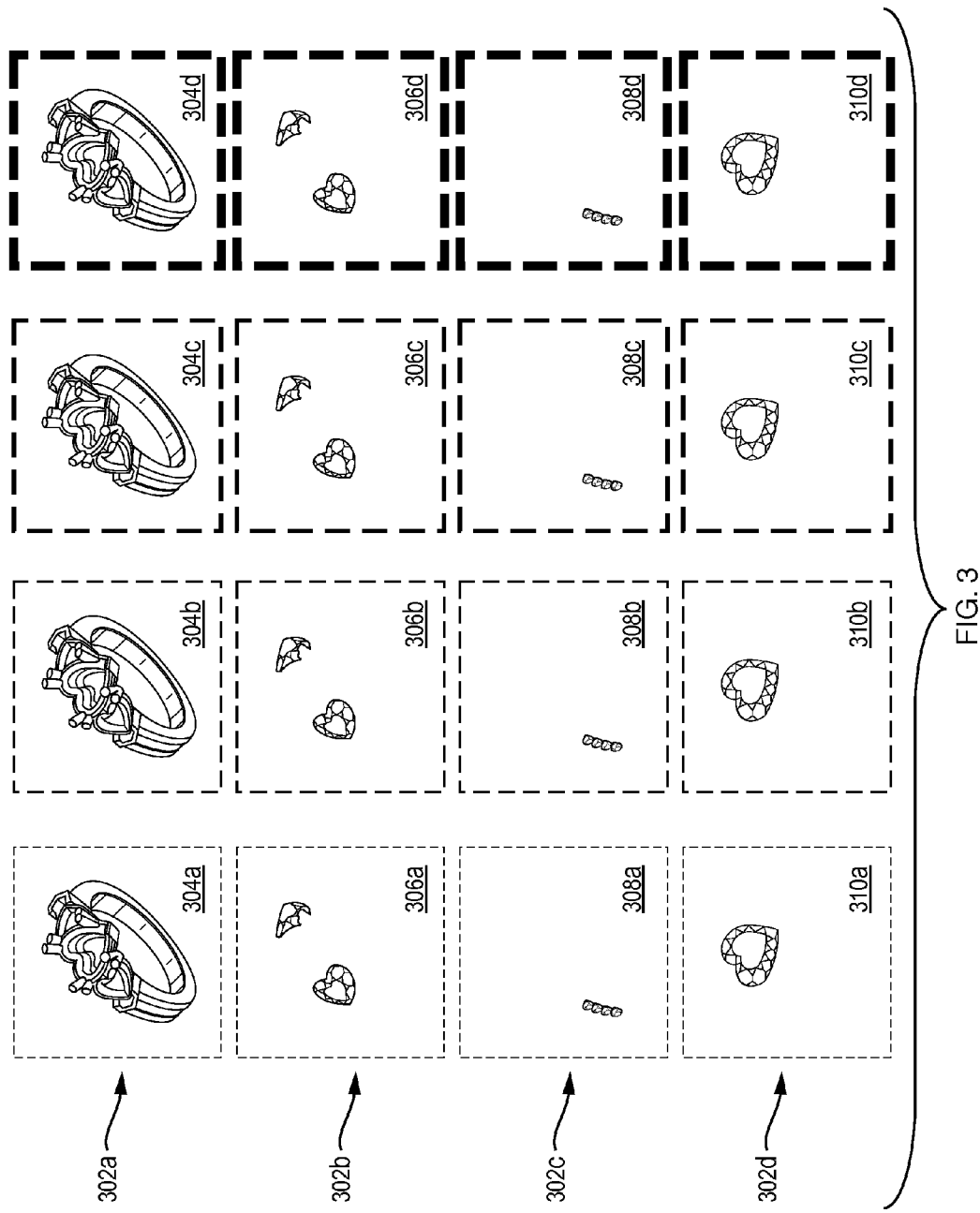
FIG. 3 shows renderings of various layers of an object model using different attribute values according to one embodiment of the present invention.

FIG. 3 illustrates a simplified example in which each of the layers 104a-d from FIG. 1 has exactly one attribute, each of which has four possible values. In particular, row 302a illustrates four renderings 304a-d of layer 104a, representing four possible values of a "metal color" attribute; row 302b illustrates four renderings 306a-d of layer 104d, representing four possible values of a "stone color" attribute; row 302c illustrates four renderings 308a-d of layer 104c, representing four possible values of a "stone color" attribute; and row 302d illustrates four renderings 310a-d of layer 104b, representing four possible values of a "stone color" attribute.

Although the examples shown in FIGS. 1-3 illustrate an object which has a fixed number of layers, this is not a requirement of the present invention. Alternatively, the number of layers m may be variable for a particular object. For example, each layer in an object representing a bracelet may represent a distinct chain in the bracelet. The user may be allowed to add and/or subtract chains from the bracelet, thereby adding and/or subtracting layers from the object model representing the bracelet. As another example, an earring may have a variable number of posts, corresponding to a variable number of layers. The use of variable layers is particularly useful for representing accessories in jewelry but may be used for any purpose. Certain layers within an object may be designated as required, in which case they may not be removed from the underlying object model. Other restrictions may be placed on layers, such as a maximum number of additional layers which may be added to a particular object model.

Figure 4:
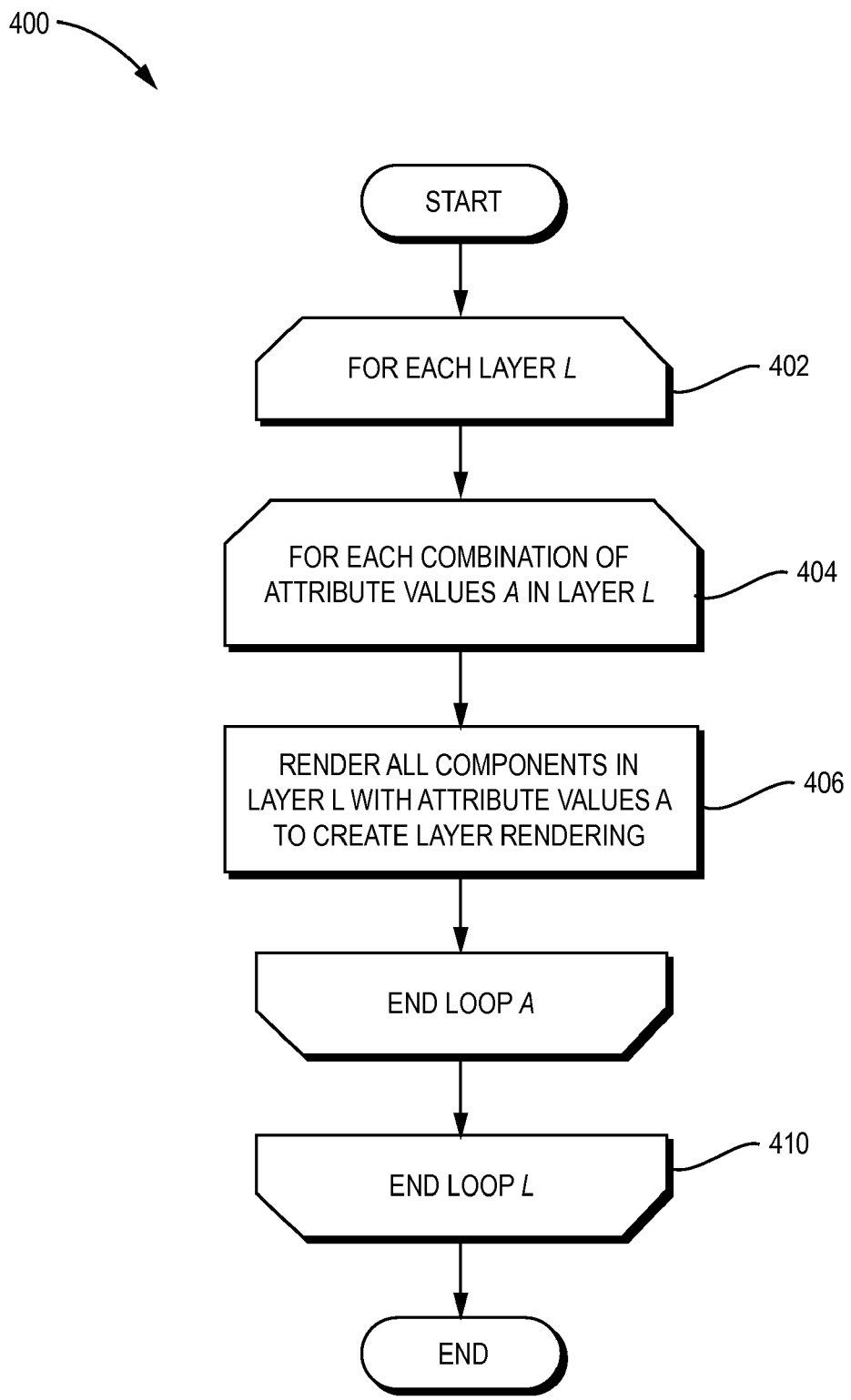
FIG. 4 is a flow chart of a method for creating renderings of layers of an object according to one embodiment of the present invention.
Figure 5:
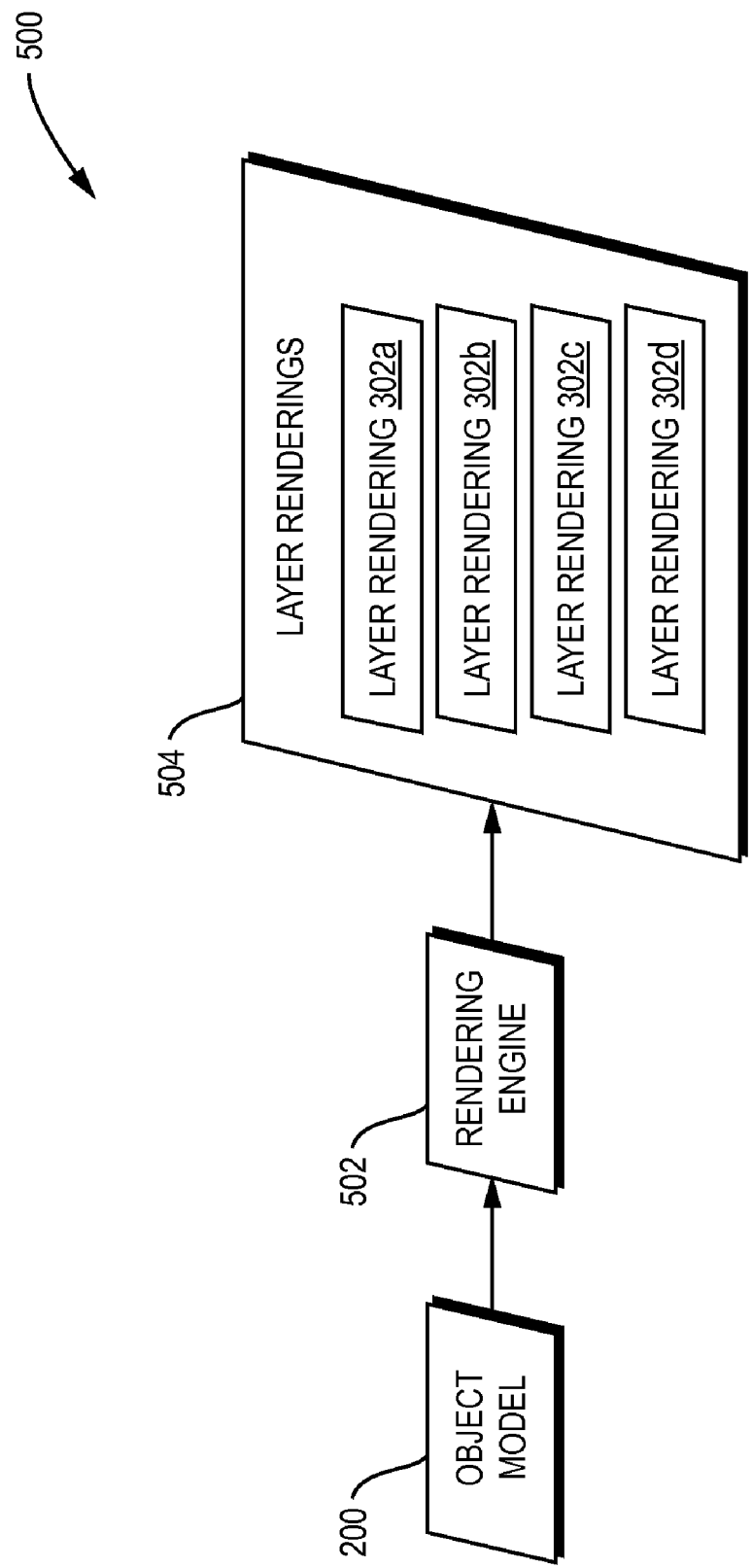
FIG. 5 is a dataflow diagram of a system for performing the method of FIG. 4 according to one embodiment of the present invention.

Once an object model, such as the object model 200 shown in FIG. 2, exists, embodiments of the present invention may render a set of 2D views of layers of the object model having all permissible attribute values. One embodiment of a method 400 for creating such renderings is shown in FIG. 4. FIG. 5 illustrates one embodiment of a system 500 which performs the method 400 of FIG. 4.

The system 500 includes a rendering engine 502 which enters a loop over each layer L in the object model 200 (step 402). Within this loop, the rendering engine 502 enters a loop over each possible combination A of values of attributes in layer L (step 404). The number of such combinations is equal to the sum of the number of possible attribute values for each attribute type in layer L.

The method 400 applies the current combination of attribute values A to all components within the current layer L and renders the resulting components to produce a two-dimensional rendering of layer L (step 406). The rendering engine 502 may render each layer L in any way, such as by using commercially available ray tracing software (e.g., VRay) by defining properties for physical materials (e.g., metal, gemstones) to produce "true-to-life" photo-realistic imagery.

Although the final rendering for each layer may represent only objects in that layer, when the rendering engine 502 renders a particular layer L, it may render not only components in layer L, but also components in other layers, to make the final rendering of layer L more realistic. For example, to produce a rendering of a particular layer L, the rendering engine 502 may first render the entire modeled object, so that any effects of other layers on the current layer L may be reflected in the rendering. Representations of components in layers other than the current layer L may then be removed from the rendering of layer L, to produce the final rendering for layer L which is stored in the layer renderings 504. This may be accomplished, for example, through use of the alpha channel, which allows objects to be present in the scene and so affect light reflections, refractions, shadows, etc. without being saved in the final image file.

The rendering engine 502 repeats step 406 for all remaining combinations of attribute values within layer L (step 408). The rendering engine 502 repeats steps 404-408 for the remaining layers in the object model (step 410). As a result of this process 400, a separate two-dimensional rendering is produced for each possible combination of attribute values within each layer. For example, in the case of the object model 200 shown in FIG. 2, which contains four layers 204a-d, the rendering engine 502 produces layer renderings 504, which contains a set of renderings 302a of layer 204a, a set of renderings 302b of layer 204b, a set of renderings 302c of layer 204c, and a set of renderings 302d of layer 204d.

The resulting 2D renderings 504 may be stored in any form, such as in individual image files on a hard disk drive or other storage medium. Information about the attributes and other data associated with the layer renderings 504 may also be stored in any form. Such data may, for example, be stored in the same files as those which contain the renderings 504, or in separate files.

Not all attribute values may result in distinct renderings from each other. For example, changing a certain attribute value of a layer may merely affect the price of the components in the layer, but may not affect how the components in that layer are rendered. In other words two distinct values of a particular attribute may result in the same rendering of the corresponding layer. In this case, it is not necessary to create separate, redundant, renderings of the layer for both attribute values. Instead, a single rendering may be used to represent both attribute values.

Such redundant renderings may be eliminated in any of a variety of ways. For example, all renderings may first be produced using the method 400 of FIG. 4. Redundant renderings may then be identified and consolidated, such that each set of two or more redundant renderings is reduced to a single representative rendering. When any of the renderings in the set is required for use in rendering the entire object, the representative rendering may be used.

Alternatively, for example, redundancies may be identified before the redundant renderings are produced. For example, in step 406, the method 400 may determine whether rendering the components in the current layer L using the current combination of attribute values A will produce a rendering that has already been produced by the method 400. If so, the method 400 may refrain from producing the rendering again, and instead store a pointer or other record indicating that the previously-generated rendering should be used whenever a rendering of layer L using attribute values A is needed.

The object model 200 may include data about the components 202a-g in addition to the attributes which are used to create the layer renderings. An example of such metadata 212, associated with component 202a, is shown in FIG. 2. Such metadata 212 need not be treated by method 400 as an attribute for purposes of generating the possible combinations of attribute values in step 404. More generally, the metadata 212 need not be used by the method 400 at all in generating the layer renderings in step 406. Examples of such metadata include prices and SKUs of components. Although only metadata 212, associated with component 202a, is shown in FIG. 2 for purposes of example, any kind and amount of metadata may be associated with any of the components 202a-g in the object model 200. Additionally or alternatively, metadata may be associated with one or more of the layers 204a-d, or with the object model 200 as a whole. Metadata may be assigned automatically and/or manually by a user.

Figure 7:
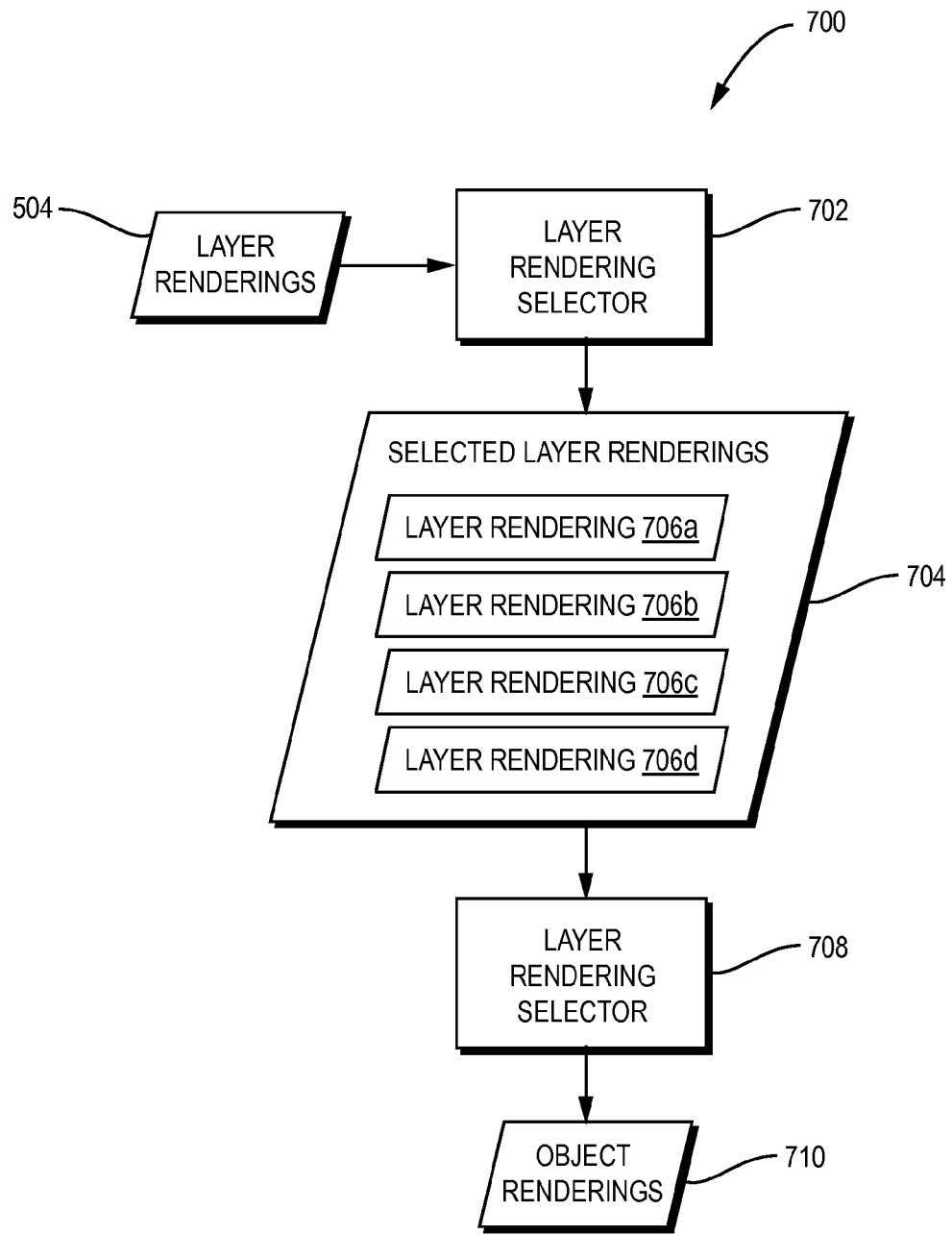
FIG. 7 is a dataflow diagram of a system for combining renderings of layers of an object to produce a rendering of the object as a whole according to one embodiment of the present invention.
Figure 8:
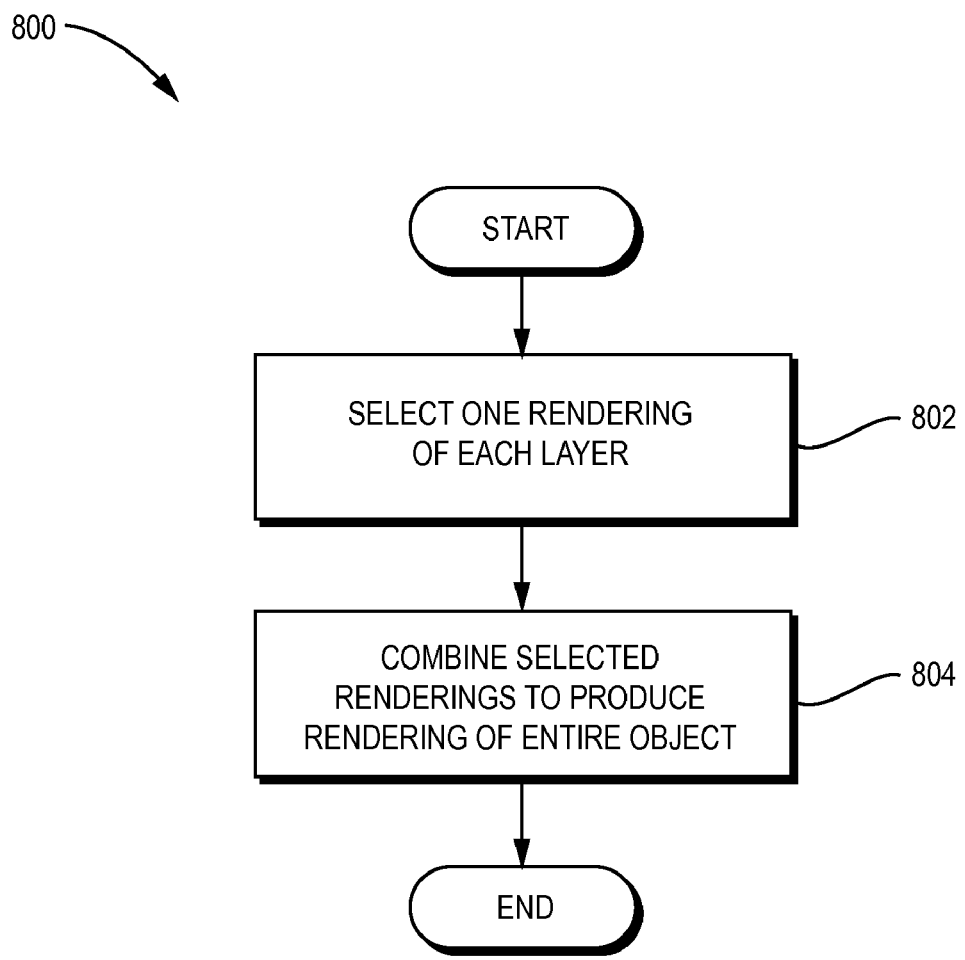
FIG. 8 is a flowchart of a method performed by the system of FIG. 7 according to one embodiment of the present invention.

The two-dimensional renderings 504 of different layers 204a-d, once produced, may be combined with each other in any combination to form a large number of personalized views of the entire modeled object. Referring to FIG. 7, a system 700 is shown for creating such a rendering of the entire modeled object according to one embodiment of the present invention. Referring to FIG. 8, a flowchart is shown of a method 800 performed by the system 700 of FIG. 7 according to one embodiment of the present invention. The system 700 includes a layer rendering selector 702 which selects one rendering from each of the sets 302a-d (FIG. 5) of layer renderings 504 to produce a set of selected layer renderings 704 (FIG. 8, step 802). In the example shown in FIG. 7, the selected layer renderings 704 include rendering 706a from layer 202a, rendering 706b from layer 202b, rendering 706c from layer 202c, and rendering 706d from layer 204d. A layer rendering combiner 708 combines the selected layer renderings 704 together to form a two-dimensional rendering 710 of the entire modeled object (FIG. 8, step 804). The object rendering 710, like the individual layer renderings 504, may be represented and stored as a raster image rather than as a three-dimensional model.

Figure 6:
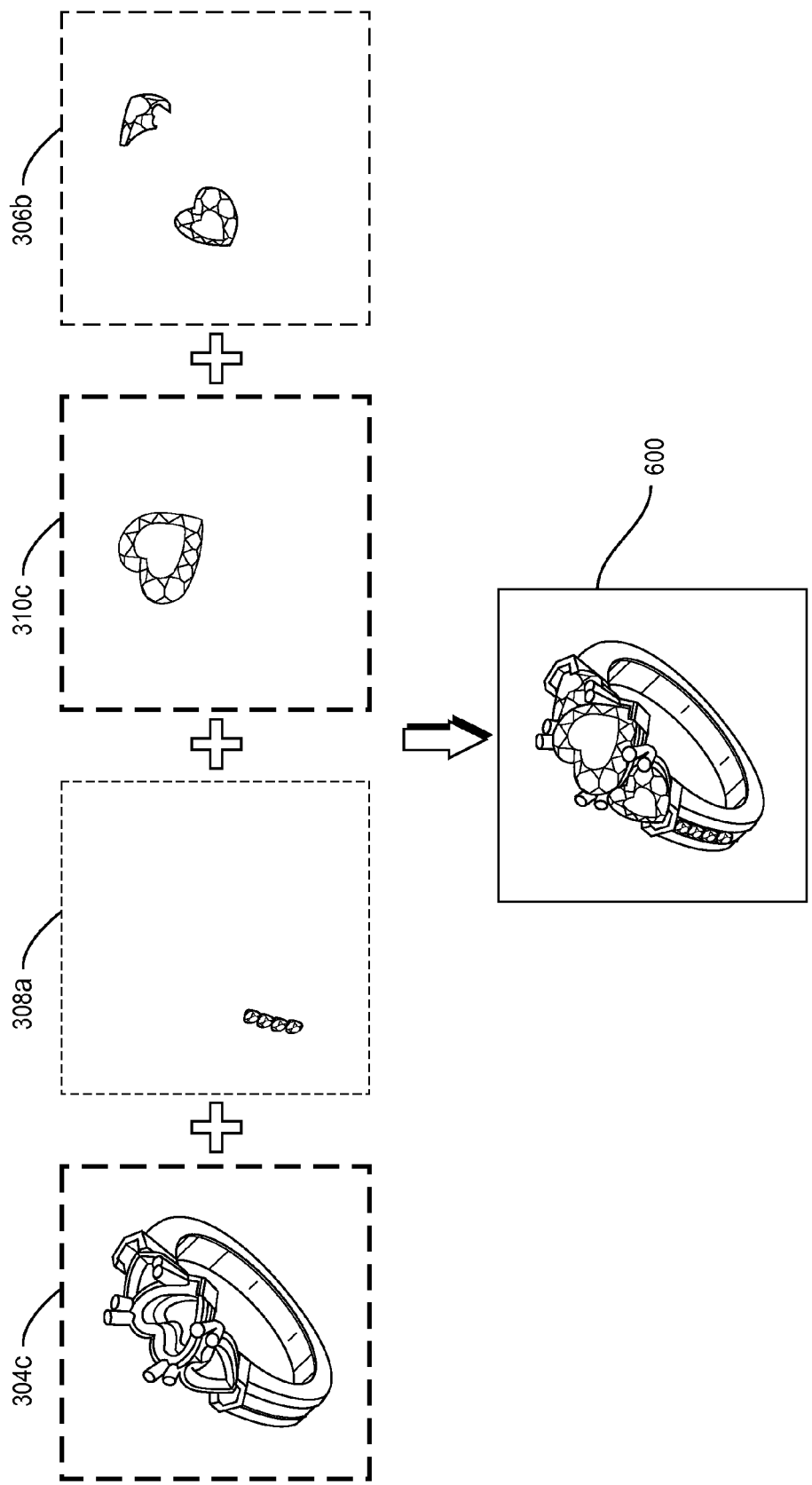
FIG. 6 illustrates an example of combining renderings of four layers to produce a customized view of an object according to one embodiment of the present invention.

FIG. 6 illustrates an example in which rendering 304c is selected from layer renderings 302a (Layer 1); rendering 306b is selected from layer renderings 302b (Layer 2); rendering 308a is selected from layer renderings 302c (Layer 3); and rendering 310c is selected from layer renderings 302d (Layer 4). In this example, layer renderings 304c, 308a, 310c, and 306b represent the selected layer renderings 706a, 706b, 706c, and 706d, respectively. These renderings 304a, 308a, 310c, and 306b are combined together to form a rendering 600 of the entire object modeled by the object model 200, representing a particular combination of attribute values. The rendering 600 in FIG. 6 is an example of the object rendering 710 in FIG. 7.

To appreciate the benefits of using a combination of the method 400 (FIG. 4) and the method 800 (FIG. 8) to produce object renderings, such as the object rendering 600 shown in FIG. 6, consider a ring with a single shank, a single center stone, a center stone setting metal, and 100 side stones, for a total of 103 components (1 shank, 1 center stone, 1 center stone setting metal, and 100 side stones). The ring components may, for example, be assigned to 5 layers, where layer 1 is the shank, layer 2 is the center stone setting, layer 3 is the center stone, layer 4 is 50 alternating side stones, and layer 5 is the other 50 alternating side stones. Suppose the shank layer has a "metal type" attribute with 10 possible values (representing 10 possible types of metal), the center stone setting has a "metal type" attribute with 10 possible values, the center stone layer has a "gemstone type" attribute with 21 possible values, and each of the two side stone layers has its own "gemstone type" attribute with 21 possible values. In this case a total of only 62 2D views (10+10+21+21+21) need to be rendered by method 400 to produce the layer renderings 504 shown in FIG. 5. This small number of renderings, however, may be combined into 926,100 possible permutations, or "personalized" views.

One advantage of embodiments of the present invention, therefore, is that they may be used to produce a very large number of personalized object renderings by rendering only a very small number of renderings of layers of the object. This is important because the process 400 used in FIG. 4 to create each individual layer rendering—producing realistic, two-dimensional rasterized images of the layers from a three-dimensional CAD model—is resource intensive, requiring significant computer processing resources or significant time to perform. In contrast, the process 800 used in FIG. 8 to combine existing rasterized layer renderings together to produce a rasterized image of the entire modeled object is computationally inexpensive.

Embodiments of the present invention only need to perform the computationally-expensive process 400 of FIG. 4 a single time, to produce a relatively small number of layer renderings 504. In a distributed computing environment, this process 400 may, for example, be performed on a computer having significant computing resources, such as a server, graphics workstation, or cluster of such computers. Then, once the layer renderings 504 have been produced, any number of realistic raster images of the entire object may be produced quickly, any number of times, by less-powerful computers using the method 800 of FIG. 8. Embodiments of the present invention, therefore, provide significant increases in efficiency of generating realistic images of customized objects, without any loss of quality of such images, in comparison to previously-used techniques.

More specifically, if $n_i^k$ refers to the $k^{th}$ attribute on layer i, and m refers to the total number of layers, then using this method, in general a total of $$\sum_{i=1}^{i=m} \sum_k n_i^k 2D$$

views would need to be rendered to produce $$\prod_{i=1}^{i=m} \prod_k n_i^k$$

possible personalized views. This represents a significant reduction in the number of renderings that need to be performed to produce all possible personalized views of the entire object.

Figure 9:
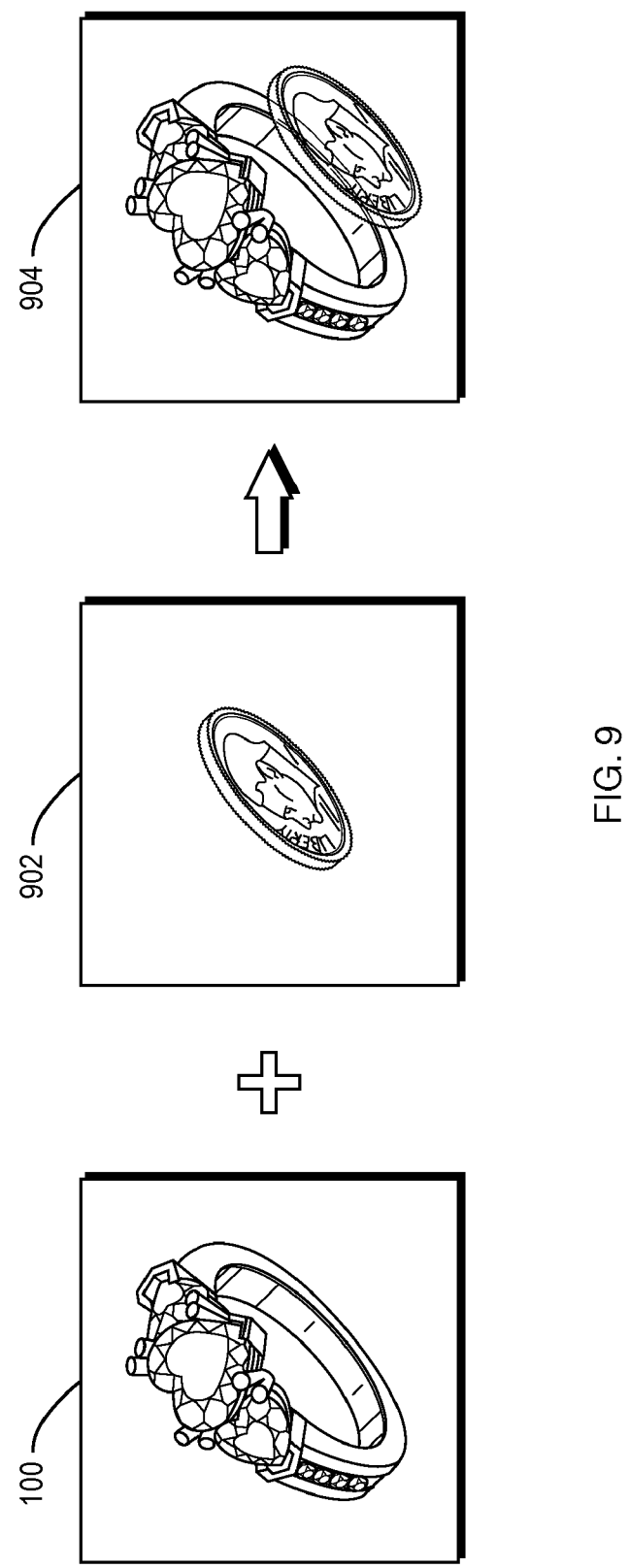
FIG. 9 illustrates the use of a reference object to indicate the scale of a rendered object according to one embodiment of the present invention.

Embodiments of the present invention may be used to display information other than renderings of the modeled object 200. For example, it can be useful when presenting 3D models in a 2D view to show physical scale with respect to a common reference object. For example, a dime or other coin may be used as a common reference object for jewelry models. FIG. 9 illustrates such an example, in which a rendering 100 of a ring is combined with a rendering 902 of a dime to produce a rendering 904 which shows both the ring and the dime, rendered to scale.

The combined rendering 904 may, for example, be produced by combining together rasterized images of the ring and dime. For example, renderings may be created of the reference object at various spatial views, and the resulting renderings may be stored for later use in combining with renderings of other objects As shown in the example of FIG. 9, the reference object may be rendered as semi-transparent so as not to obscure the primary object being rendered.

Although in certain examples disclosed herein, different components are combined together merely by combining pre-rendered rasterized images of those components, components may be combined in other ways to produce the final object rendering 710. For example, if the user selects a particular chain for inclusion in a pendant, the resulting pendant may be rendered to display the chain threaded through the bail(s) of the pendant. The final rendering may reflect the size of the chain and of the bail(s) to accurately represent how the chain would appear if threaded through the bail(s).

As another example, a ring may be rendered as fitted to a model of a human hand. Similarly, a necklace may be displayed as fitted to a model of a human neck. Such renderings may accurately represent how such jewelry would appear when worn on particular parts of the human body.

Figure 10:
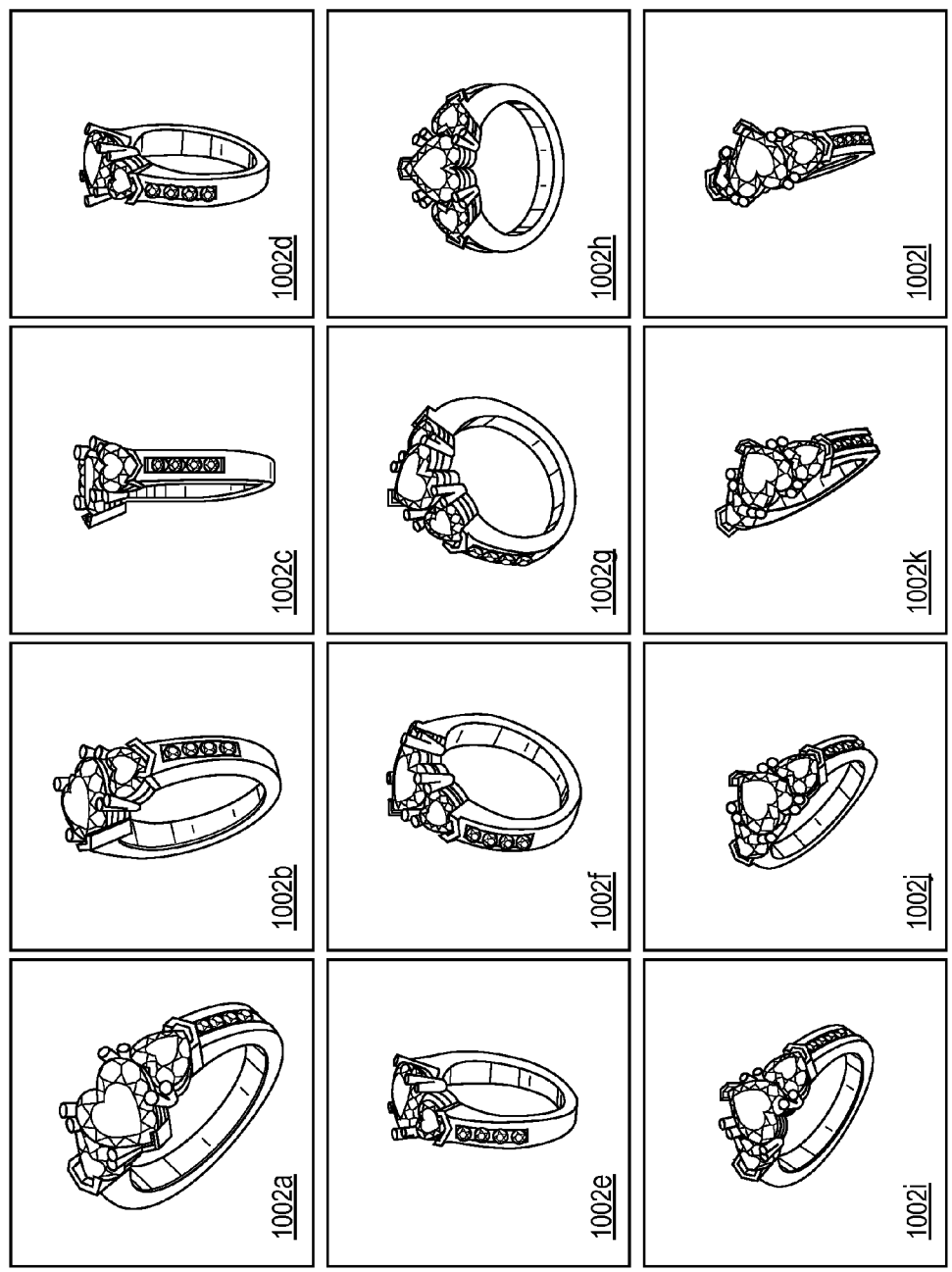
FIG. 10 illustrates a "fly-by" view of an object according to one embodiment of the present invention.

In addition to the primary set of renderings 504 of layers of the object described above, a set of 2D views of the entire object from various perspectives may be generated to allow a 3D Virtual Reality (VR) "fly-by" of the object. The sequence of 2D views that comprise the fly-by may, for example, include "camera" views of the object from different spatial locations. An example of such views 1002a-1 is shown in FIG. 10. As can be seen from FIG. 10, if the views 1002a-1 were to be displayed on-screen in sequence, the result would be the appearance of flying around the ring to view it from different perspectives.

Such different camera views may be rendered using the techniques disclosed above, using any pre-selected combination of attribute values. Alternatively, for example, the different camera views 1002a-1 may include different personalized combinations of the object being rendered. In other words, attribute values of one or more layers in the object may be varied from camera view to camera view. When such camera views are displayed as an animation, the effect is to show attribute values (e.g., stone types/colors, metal types/colors) of the rendered object changing as the fly-by progresses. This process could also be used to generate an entire fly-by animation in the personalized configuration selected by the user. One advantage of changing the attribute values in this way is that it allows the user to see not only the same object from different angles, but also different personalizations of the object, but without incurring the resource overhead (memory, processor time, and disk storage) required to render a complete fly-by for each distinct personalization of the object.

It is also desirable to include shadows in the final rendering 710 of the modeled object 200 to make the rendering 710 as realistic as possible. It is inefficient, however, to store separate renderings of the shadows created by components in a layer for every possible combination of attribute values for that layer, since changes in most attribute values (e.g., colors and materials) do not affect the shadows cast by the layer. Therefore, the shadows of all components having a fixed shape in an object may be rendered and stored in a single layer referred to herein as a "ground plane," which may be thought of as a "shadow layer" because its purpose is to store shadows cast by fixed-shape components of the object. As a result, such shadows need not be stored in other renderings of those components. In particular, such shadows need not be stored in the layer renderings 504 (FIG. 5). Instead, the ground plane may be stored as a layer rendering (e.g., as a raster image) in addition to and separate from the layer renderings 504. Furthermore, multiple different ground plane layers may be created of diverse colors and patterns. The purpose of this is to allow the object to be displayed in different surroundings for aesthetic purposes.

Figure 11:
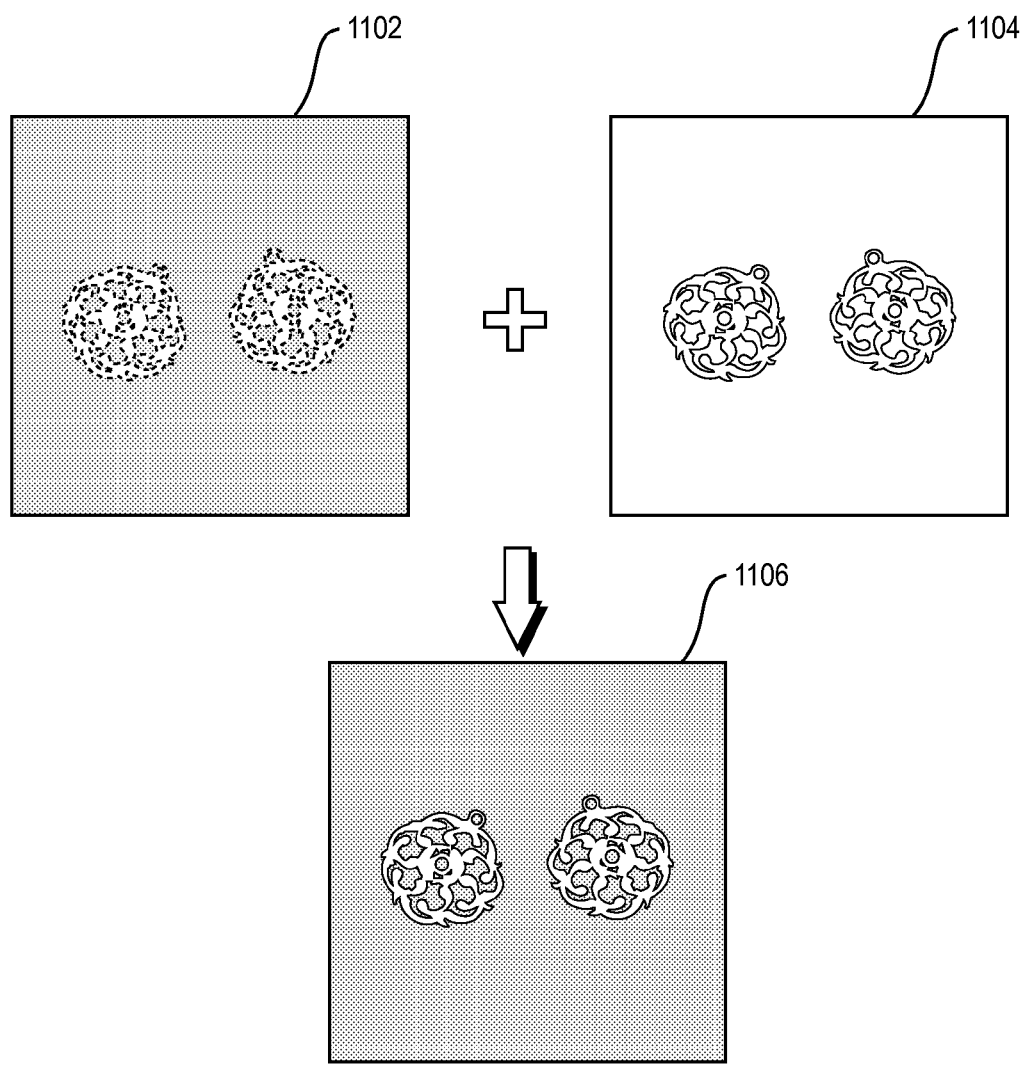
FIG. 11 illustrates combining a ground plane containing shadows with a rendering of a layer of an object according to one embodiment of the present invention.

When the entire object model 200 is later rendered, one or more of the ground planes may be combined with the selected layer renderings 704 as part of the process 800 (FIG. 8) performed by the system 700 of FIG. 7 to produce the final object rendering 710. FIG. 11 shows an example in which a ground plane 1102 is combined with an object rendering 1104 to produce a final object rendering 1106 which contains both the shadows from the ground plane 1102 and the components from the object rendering 1104.

The shadows of those components whose shapes may vary may be handled differently from those with invariant shapes. In particular, the shadows of variable-shape components may be rendered and stored within the layer renderings 504 of those components themselves (rather than in the ground plane). For example, if a particular component may have either a rectangular or oval shape, a rectangular version of the component and its shadow may be rendered and stored in one layer rendering, while the oval version of the component and its shadow may be rendered and stored in another layer rendering. If the rectangular version of the component is later selected for inclusion in the final object, the pre-rendering of the rectangular object and its shadow may be combined with the other selected components to produce the final object rendering.

Figures 12A, 12B:
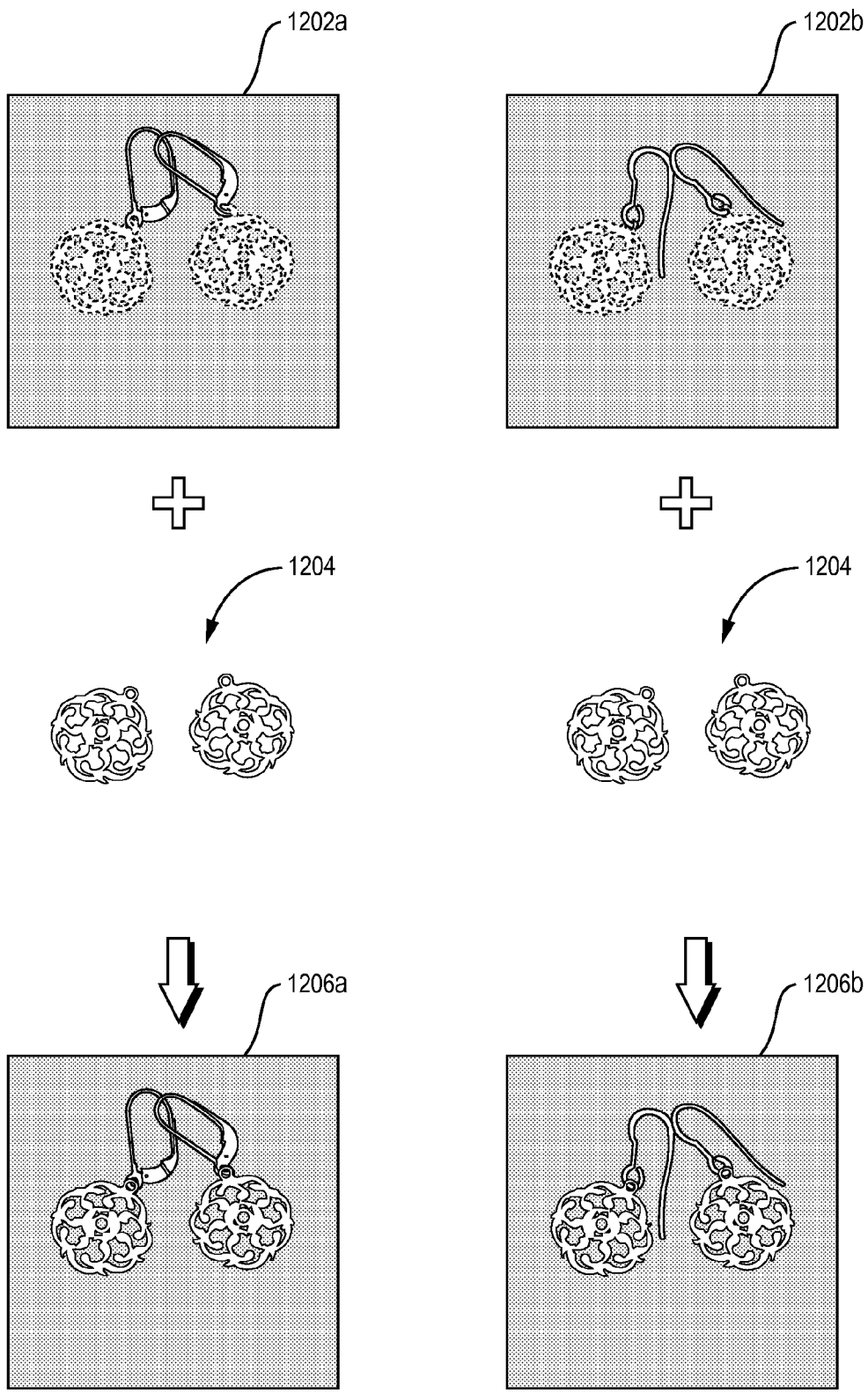
Figure 4:
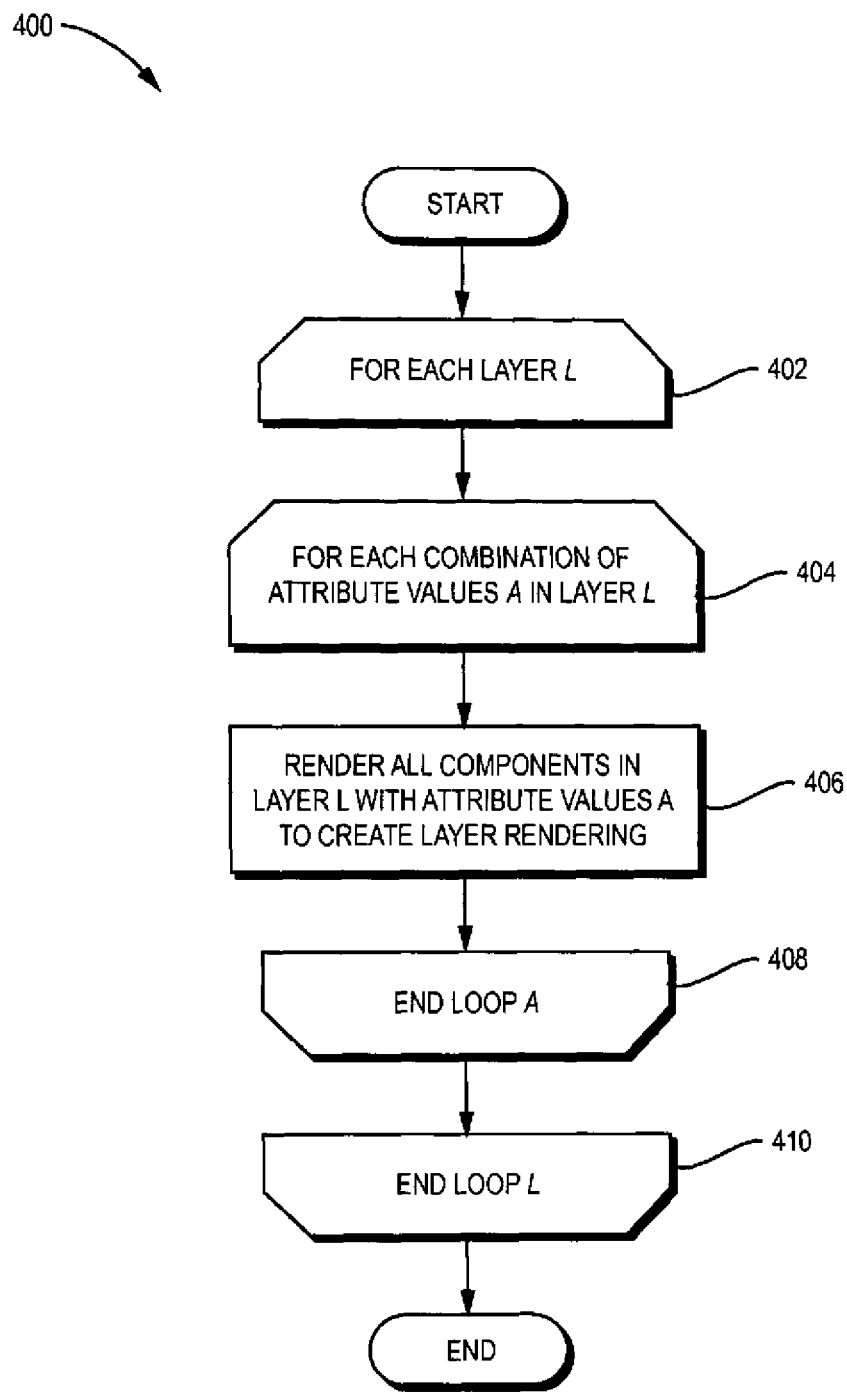

One benefit of storing the shadows of invariant-shaped components in the ground plane and storing shadows of variable-shaped components in the individual renderings of those components' layers is that this scheme stores only as many different shadows as are necessary to produce accurate final object renderings. Referring to FIGS. 12A-B, examples are shown in which renderings of a variable-shaped object are combined with renderings of an invariant-shaped object. FIG. 12A illustrates an example in which a first rendering 1202a of variable-shaped components includes the shadows of those components, and in which a rendering 1204 of invariant-shaped components does not include the shadows of those components. The rendering 1202a, including the shadows it contains, is combined with the rendering 1204, to produce final object rendering 1206a. Note that a ground plane, representing shadows of the invariant-shaped objects in rendering 1204, could also be combined with renderings 1202a and 1204 to produce final object rendering 1206a.

FIG. 12B illustrates an example in which a second rendering 1202b of the variable-shaped components from rendering 1202a includes the shadows of those components. The shadows in rendering 1202b differ from those in rendering 1202a. In FIG. 12B, the same rendering 1204 of the invariant-shaped objects is used. The rendering 1202b, including the shadows it contains, is combined with the rendering 1204, to produce final object rendering 1206b.

In order to achieve the realistic effect of visualizing the variable-shaped component as interfacing correctly with the fixed-shape component without requiring a second image of either component, the variable-shaped component may be separated out into its own plane. For example, recall that in FIGS. 12A and 12B, the ground planes 1202a and 1202b include both variable-shaped components and their shadows. Alternatively, for example, in the embodiment illustrated in FIGS. 12C and 12D, the ground planes 1212a and 1212b solely contain shadows; i.e., they do not contain the variable-shaped components.

Instead, in the embodiment illustrated in FIGS. 12C and 12D, the variable-shaped components have been separated out into planes 1215a and 1215b. As in FIGS. 12A and 12B, the fixed-shaped components are retained within their own plane 1214 in FIGS. 12C and 12D. Note that holes may be rendered at appropriate locations within the variable-shaped components in planes 1215a and 1215b so that the variable-shaped components appear to interact realistically with the fixed-shape components of plane 1214 when the fixed-shape and variable-shape components are combined together. In particular, the holes are placed at locations where the fixed-shape components intersect the variable-shape components.

When the layers in FIG. 12C or in FIG. 12D are combined, the ground (shadow) plane (layer 1212a or layer 1212b) may be rendered first, i.e., at the "bottom" of the stack. The fixed-shape components (layer 1214) may be rendered next, i.e., on "top" of the ground plane, in the "middle" of the stack. The variable-shape components (e.g., layer 1215a or 1215b) may be layered last, i.e., on "top" of the other two planes, at the "top" of the stack. This achieves a realistic three-dimensional effect in which the fixed-shape components appear to pass through the holes in the variable-shaped components in the resulting final object renderings 1216a and 1216b.

Each of the layer renderings 504 represents a particular layer rendered with one or more particular attribute values. Each of the layer renderings 504 may be encoded with information such as the name of the layer and the names (e.g., types) of the attributes of the layer by, for example, saving the layer rendering in a file having a filename which includes text representing the layer and attribute name(s), so that the particular file which encodes a particular layer with particular attributes may be easily identified. Such a filename may, for example, have a format such as: "<design name>_RenComp_<layer name>_<attribute name>_<view>". Names of multiple attributes may be encoded within such a filename. Note that "<view>" represents the type of view of the layer rendering, such as front, side, or top.

For example, the filename "Design_RenComp_CS_E_P" may be used to store a file containing a rendering of a layer containing an emerald ("E" in the filename) selected for the center stone layer ("CS" in the filename), rendered in perspective view ("P" in the filename). As another example, the filename "Design_RenComp_SM_RG_P" may be used to store a file containing a rendering of a layer containing rose gold ("RG" in the filename) selected for the shank metal layer ("SM" in the filename), also rendered in perspective view ("P" in the filename). This encoding scheme may be used to facilitate combining the 2D layer renderings 504 into the final object rendering 710.

Similarly, the final object rendering 710 may be stored in a file having a filename which encodes information about which layers are represented in the final object rendering 710. For example, in the case of a ring, a filename of the following form may be used: "<design name>_Ren_<shank>-<shank2>-<center stone metal>-<side stone metal>_<center stone type>-<primary side stone type><secondary side stone type>_<view>". For example, the filename "Design_Ren_YG--YG-_E-DE_P" may be used for a ring in which a yellow gold shank ("YG" in the filename) is combined with an Emerald center stone ("E" in the filename) with Diamond primary side stones and Emerald secondary side stones ("DE" in the filename) in a perspective view ("P" in the filename).

As mentioned above, not all information in the object model 200 need be used to generate distinct layer renderings. Rather, certain information in the object model 200 may be used for other purposes. One example is to calculate the price of a particular customized object (i.e., a personalized object reflecting a particular combination of attribute values). Such calculation may be performed, for example, by providing the attribute values of the object model 200 to a price calculation engine, which may use the attribute values (possibly in combination with information such as the current cost of particular types of gemstones, markup amounts, and discounts) to calculate the price of the entire personalized object. Metadata, such as metadata 212, may be used in addition to, or instead of, the object model's attribute values to perform the price calculation.

Pricing for a particular component may be determined in any way, such as by calculating the price based on features (e.g., size, material) of the component, or simply by looking up the price of the component (such as by using the component's SKU as an index into a database). However the price is calculated, the resulting price may be displayed to the user as part of or in addition to the final object rendering 710. As a result, the consumer may select a particular set of attribute values for each layer, and in response immediately see a photo-realistic rendering of the object along with its associated price.

Responsibility for performing different steps in the process of creating the personalized object rendering may be divided among computing devices and components in any of a variety of ways. For example, in a client-server system, the server could perform the layer pre-rendering process 400 of FIG. 4 a single time. Then, when a user at one of the clients requests a personalized object having a particular combination of attribute values, the client could transmit the attribute values to the server over a network.

In response, the server could transmit back to the client, over the network, the pre-rendered layer renderings corresponding to the selected attribute values. The client could then perform the layer-combining process 800 of FIG. 8 to produce the final rendering of personalized object, having a particular combination of attribute values selected by the user.

As another example, in response to the request from the client, the server could perform the layer-combining process 800 of FIG. 8 to produce the final rendering of personalized object, having a particular combination of attribute values selected by the user. The server could then transmit the personalized object rendering back to the client over a network. The client could then simply display the personalized object rendering to the user.

As yet another example, the server may perform a one-time transmission of all of the layer renderings 504 to each of the clients. Then, when a user at a particular client makes a request for a particular personalized rendering having a particular combination of attribute values, the client may perform the layer-combining process 800 of FIG. 8 without the need to make a trip to the server.

In any of these cases, the client computer need not perform the computationally-intensive layer rendering process 400 of FIG. 4. As a result, the client computer may be a relatively low-end computer, such as the kind typically used by home computer users, having a conventional web browsing client but lacking the CAD software and other software necessary to perform the layer-rendering process 400 of FIG. 4.

Once a particular personalized object rendering is produced, whether by a client or server, the personalized rendering may be cached so that it may be displayed in response to subsequent requests for the same combination of attribute values, without needing to re-perform the layer-combining method 800 of FIG. 8. If personalized views are created at the server, then such caching may be performed at the server. Additionally or alternatively, the server may transmit such personalized views to one or more of the clients so that subsequent requests at those clients may be serviced quickly, without the need for a trip to the server.

If the personalized object views are generated by the client machines, then such caching may, for example, be performed at each client as it generates each personalized view. Additionally or alternatively, each client may transmit any personalized views it generates back to the server, so that subsequent requests made by the same or other clients may be serviced without the need to re-generate the same view.

To further increase the speed at which personalized object views may be displayed to users, certain personalized object views representing certain combinations of attribute values may be pre-generated into complete object renderings so that such renderings are ready to display immediately to users upon selection of those combinations of attribute values, without the need to perform the layer-rendering process 400 of FIG. 4 or the layer-combining process 800 of FIG. 8.

The particular set of personalized object views to pre-render may be selected in any way. For example, certain attribute value combinations which are known or suspected to be highly desirable, such as white gold metal and diamond stone for use in a wedding ring, may be pre-rendered into final object renderings. When a user selects any such combination of attribute values, the corresponding object rendering may be displayed to the user immediately, merely by displaying the pre-generated object rendering to the user.

Combinations of attribute values to pre-render may also be selected, for example, using rules. A particular rule, for example, might apply to a particular kind of jewelry or a particular model of ring. For example, an "engagement ring" rule might specify that it is preferred for engagement rings to have diamonds as the stone, and that certain colors should not be combined with certain other colors within an engagement ring. Such a rule may then be used to automatically pre-render all component combinations which satisfy the rule. Such pre-renderings may, for example, be generated at the merchant's site before deploying the system for use by users.

Such pre-rendered combinations may be produced in any of a variety of ways. For example, they may be produced by rendering the entire object as a single scene, based on the individual attribute values selected by the user. As another example, pre-rendered combinations may be produced by combining together existing pre-renderings of the individual components selected by the user, using process 800. The latter technique may be used to significantly reduce the amount of time necessary to produce popular pre-renderings.

A search facility may be provided through which the user may search for particular component combinations. Search may be conducted in two ways: static search and dynamic search. With static search, only those combinations which have already been pre-rendered may be available for searching. Therefore, initially only those combinations which have been pre-selected for pre-rendering when the system is initialized may be available for searching. As users selected particular combinations of components with particular attributes (also referred to herein as "particular variations"), the renderings of such particular variations may be saved and added to the store of particular variations which are available for searching. With dynamic search, the system will interrogate all attributes of an object to determine whether or not a component combination will satisfy the search criteria. If the component combination matches the search criteria via attribute interrogation and the corresponding object does not exist, the object will be created dynamically and will be returned in the search results. Note that the dynamic search will incur more performance overhead than the static search.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Furthermore, although particular embodiments of the present invention are described in connection with jewelry, the same techniques may be applied to any kind of object.

For example, data processed by embodiments of the present invention may be stored in any form. For example, three-dimensional design data may be stored in CAD files, which may be subdivided into any number of files, such as one file per design, one file per layer, or one file per component. Meta-data, such as information about the type and number of components in a design, may be stored in the same or different file from the design data itself.

Although in the example shown in FIG. 4, the method 400 uses all combinations of values of all attributes of each layer L to render the layer L, this is not a requirement of the present invention. Rather, for example, only a subset of the layer's attribute types may be used to render the layer. As another example, the method 400 may produce layer renderings for fewer than all possible values of an attribute. If a user subsequently requests a combination of attribute values for which not all required layer renderings were previously produced, any needed layer renderings may be produced in response to such a request, and then used to produce a final object rendering using the method 800 of FIG. 8. Alternatively, for example, a layer rendering representing attribute values which are closest to those requested by the user may be selected, and then used to produce a final object rendering using the method 800 of FIG. 8, thereby avoiding the need to produce additional layer renderings.

Although only a single object model 200 is shown in FIG. 2, the techniques disclosed herein may be used in systems including any number of object models. For example, an online retail web site may allow a user to select any one of a plurality of object, such as any one of a plurality of items of jewelry, and then customize the selected object for purchase using the techniques disclosed herein.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer-readable computer program instructions tangibly stored on a first non-transitory computer-readable medium, the method for use with a three-dimensional computer model of an object, the model comprising a plurality of layers L, each of the plurality of layers comprising at least one corresponding component in the model, each of the plurality of layers being associated with at least one attribute, the method comprising:
- (A) rendering each of the plurality of layers L with each of a plurality of values A of the at least one attribute to produce a plurality of layer renderings, comprising:
  - (A)(1) entering a first loop over each of the plurality of layers L;
  - (A)(2) entering a second loop over each of the plurality of values A of the at least one attribute; and
  - (A)(3) for each particular layer within the plurality of layers L and for each particular attribute value within the plurality of attribute values A, applying the particular attribute value to the particular layer to produce a rendering of the particular layer;
- (B) storing the plurality of layer renderings on a second non-transitory computer-readable medium;
- (C) receiving a first request for a first rendering of a personalized object specifying a plurality of attribute values;
- (D) selecting, from among the plurality of stored layer renderings, a subset of layer renderings corresponding to the specified plurality of attribute values; and
- (E) combining the selected subset of layer renderings to produce the first rendering of the personalized object.

2. The method of claim 1, wherein a first one of the plurality of layers comprises a plurality of components, and wherein (A) comprises rendering the plurality of components in the first layer with each of the plurality of values A of the at least one attribute.

3. The method of claim 1, wherein (A) further comprises:
- (A)(4) removing, from the rendering of the particular layer, representations of all layers other than the particular layer.

4. The method of claim 1, further comprising:
- (F) identifying, based on the specified plurality of attribute values, a price of the personalized object.

5. The method of claim 1, wherein (A) comprises rendering shadows of variable-shape components, whereby the plurality of layer renderings include the shadows of the variable-shape components;
wherein the method further comprises:
- (F) rendering shadows of invariant-shaped components to produce a layer rendering, distinct from the plurality of stored layer renderings, containing the shadows of the invariant-shaped components; and
wherein (E) comprises combining the selected subset of layer renderings with each other and with the layer containing the shadows of the invariant-shaped components to produce the rendering of the personalized object.

6. The method of claim 1, further comprising:
- (F) storing the first rendering;
- (G) receiving a second request specifying the plurality of attribute values;
- (H) in response to the second request, providing the first rendering.

7. The method of claim 6, wherein (E) is performed by a first computing device, wherein the method further comprises:
- (I) after (E), at the first computing device, transmitting the first rendering of the personalized object to a second computing device; and
wherein (F), (G), and (H) are performed by the second computing device.

8. The method of claim 7, wherein (H) comprises, at the second computing device, transmitting the first rendering over a network to a third computing device.

9. The method of claim 1, wherein (C) and (D) are performed by a first computing device, wherein (E) is performed by a second computing device, and wherein the method further comprises:
- (F) before (E), at the first computing device, transmitting the subset of layer renderings over a network to the second computing device.

10. The method of claim 1, wherein (C), (D), and (E) are performed by a first computing device, and wherein the method further comprises:
- (F) after (E), transmitting the first rendering of the personalized object to a second computing device.

11. A computer program product comprising computer-readable computer program instructions, tangibly stored on a first non-transitory computer-readable medium, for execution by a computer processor to perform a method for use with a three-dimensional computer model of an object, the model comprising a plurality of layers, each of the plurality of layers comprising at least one corresponding component in the model, each of the plurality of layers being associated with at least one attribute, the method comprising:
- (A) rendering each of the plurality of layers L with each of a plurality of values A of the at least one attribute to produce a plurality of layer renderings, comprising:
  - (A)(1) entering a first loop over each of the plurality of layers L;
  - (A)(2) entering a second loop over each of the plurality of values A of the at least one attribute; and
  - (A)(3) for each particular layer within the plurality of layers L and for each particular attribute value within the plurality of attribute values A, applying the particular attribute value to the particular layer to produce a rendering of the particular layer;
- (B) storing the plurality of layer renderings on a second non-transitory computer-readable medium;
- (C) receiving a first request for a first rendering of a personalized object specifying a plurality of attribute values;
- (D) selecting, from among the plurality of stored layer renderings, a subset of layer renderings corresponding to the specified plurality of attribute values; and
- (E) combining the selected subset of layer renderings to produce the first rendering of the personalized object.

12. The computer program product of claim 11, wherein a first one of the plurality of layers comprises a plurality of components, and wherein (A) comprises rendering the plurality of components in the first layer with each of the plurality of values A of the at least one attribute.

13. The computer program product of claim 11, wherein (A) further comprises:
- (A)(4) removing, from the rendering of the particular layer, representations of all layers other than the particular layer.

14. The computer program product of claim 11, further comprising:
- (F) identifying, based on the specified plurality of attribute values, a price of the personalized object.

15. The computer program product of claim 11, wherein (A) comprises rendering shadows of variable-shape components, whereby the plurality of layer renderings include the shadows of the variable-shape components;
wherein the method further comprises:
- (F) rendering shadows of invariant-shaped components to produce a layer rendering, distinct from the plurality of stored layer renderings, containing the shadows of the invariant-shaped components; and wherein (E) comprises combining the selected subset of layer renderings with each other and with the layer containing the shadows of the invariant-shaped components to produce the rendering of the personalized object.

16. The computer program product of claim 11, further comprising:
(F) storing the first rendering;
(G) receiving a second request specifying the plurality of attribute values;
(H) in response to the second request, providing the first rendering.

17. The computer program product of claim 16, wherein (D) is performed by a first computing device, wherein the method further comprises:
(I) after (E), at the first computing device, transmitting the first rendering of the personalized object to a second computing device; and wherein (F), (G), and (H) are performed by the second computing device.

18. The computer program product of claim 17, wherein (H) comprises, at the second computing device, transmitting the first rendering over a network to a third computing device.

19. The computer program product of claim 11, wherein (C) and (D) are performed by a first computing device, wherein (E) is performed by a second computing device, and wherein the method further comprises:
(F) before (E), at the first computing device, transmitting the subset of layer renderings over a network to the second computing device.

20. The computer program product of claim 11, wherein (C), (D), and (E) are performed by a first computing device, and wherein the method further comprises:
(F) after (E), transmitting the first rendering of the personalized object to a second computing device.

* * * * *

UNITED STATES PATENT AND TRADEMARK OFFICE
CERTIFICATE OF CORRECTION

PATENT NO. : 8,194,069 B2  Page 1 of 1
APPLICATION NO. : 13/111773
DATED : June 5, 2012
INVENTOR(S) : Grant Thomas-Lepore et al.

It is certified that error appears in the above-identified patent and that said Letters Patent is hereby corrected as shown below:

On the face page, in field (63), under "Related U.S. Application Data", in column 1, line 2, delete "Jan. 7, 2011," and insert -- Jan. 7, 2010, --, therefor.

Signed and Sealed this
Eleventh Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,194,069 B2 | |
| APPLICATION NO. | : 13/111773 | |
| DATED | : June 5, 2012 | |
| INVENTOR(S) | : Grant Thomas-Lepore et al. | |

It is certified that error appears in the above-identified patent and that said Letters Patent is hereby corrected as shown below:

Add reference numeral 408 to FIG. 4, as shown in the attached Replacement Sheet.

Signed and Sealed this
Ninth Day of October, 2012

David J. Kappos
*Director of the United States Patent and Trademark Office*